(12) United States Patent
Karapetyan et al.

(10) Patent No.: US 10,336,877 B2
(45) Date of Patent: Jul. 2, 2019

(54) MOLDED POLYURETHANE BODIES WITH EXCELLENT FLEXIBILITY AT LOW TEMPERATURE

(71) Applicant: BASF SE, Ludwigshafen am Rhein (DE)

(72) Inventors: Gnuni Karapetyan, Bad Essen (DE); Marco Ortalda, Turin (IT); Marco Valieri, Moscow (RU)

(73) Assignee: BASF SE, Ludwigshafen am Rhein (DE)

( * ) Notice: Subject to any disclaimer, the term of this patent is extended or adjusted under 35 U.S.C. 154(b) by 86 days.

(21) Appl. No.: 15/556,643

(22) PCT Filed: Mar. 1, 2016

(86) PCT No.: PCT/EP2016/054271
§ 371 (c)(1),
(2) Date: Sep. 8, 2017

(87) PCT Pub. No.: WO2016/142208
PCT Pub. Date: Sep. 15, 2016

(65) Prior Publication Data
US 2018/0057650 A1 Mar. 1, 2018

(30) Foreign Application Priority Data
Mar. 9, 2015 (EP) .................................... 15158194

(51) Int. Cl.
| | | |
|---|---|---|
| *C08G 18/42* | (2006.01) |
| *C08J 9/00* | (2006.01) |
| *C08G 18/79* | (2006.01) |
| *C08G 18/12* | (2006.01) |
| *B29C 39/00* | (2006.01) |
| *B29D 35/12* | (2010.01) |
| *C08J 9/12* | (2006.01) |
| *C08G 101/00* | (2006.01) |
| *B29K 75/00* | (2006.01) |
| *B29K 105/04* | (2006.01) |

(52) U.S. Cl.
CPC ........... *C08J 9/0023* (2013.01); *B29C 39/003* (2013.01); *B29D 35/122* (2013.01); *C08G 18/12* (2013.01); *C08G 18/4202* (2013.01); *C08G 18/4236* (2013.01); *C08G 18/4238* (2013.01); *C08G 18/797* (2013.01); *C08J 9/0061* (2013.01); *C08J 9/125* (2013.01); *B29K 2075/00* (2013.01); *B29K 2105/04* (2013.01); *C08G 2101/0066* (2013.01); *C08G 2101/0083* (2013.01); *C08J 2203/10* (2013.01); *C08J 2375/06* (2013.01)

(58) Field of Classification Search
CPC ... C08G 18/797; C08G 18/12; C08G 18/4202
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 3,615,972 A | 10/1971 | Morehouse, Jr. et al. |
| 4,383,050 A | 5/1983 | Nissen et al. |
| 4,581,387 A | 4/1986 | Werner et al. |
| 4,764,537 A | 8/1988 | Horn et al. |
| 2016/0145372 A1 | 5/2016 | Doroodian et al. |
| 2018/0258216 A1* | 9/2018 | Lista ................. C08G 18/4804 |

FOREIGN PATENT DOCUMENTS

| | | | |
|---|---|---|---|
| CA | 1277471 C | 12/1990 | |
| CA | 2633599 A1 * | 7/2007 | ........... A61K 8/0208 |
| DE | 111394 C | 7/1899 | |
| DE | 1152536 B | 8/1963 | |
| DE | 1152537 B | 8/1963 | |
| DE | 3042558 A1 | 6/1982 | |
| DE | 3607447 A1 | 9/1987 | |
| EP | 0153639 A2 | 9/1985 | |
| EP | 0250351 A2 | 12/1987 | |
| EP | 2818489 A1 | 12/2014 | |
| GB | 987618 A | 3/1965 | |
| GB | 1040452 A | 8/1966 | |
| WO | 2009065826 A1 | 5/2009 | |
| WO | 2010125009 A1 | 11/2010 | |
| WO | WO-2014124967 A1 * | 8/2014 | ............. C08K 3/346 |
| WO | 2015/062960 A1 | 5/2015 | |

OTHER PUBLICATIONS

Translation of WO 2009065826A1 by Ortalda et al. (Year: 2009).*
International Search Report for International Application No. PCT/EP2016/054271, dated May 2, 2016, 2 pages.
Extended European Search Report for EP Patent Application No. 15158194.9, dated Sep. 29, 2015, 3 pages.

* cited by examiner

*Primary Examiner* — Michael M Dollinger
*Assistant Examiner* — Christina H Wales
(74) *Attorney, Agent, or Firm* — Armstrong Teasdale LLP

(57) ABSTRACT

The present invention relates to a process for producing polyurethane moldings, wherein (a) organic polyisocyanates are mixed with (b) one or more compounds having at least two hydrogen atoms which are reactive toward isocyanate, comprising polyester polyol, (c) blowing agent, (d) catalyst, and (e) propylene carbonate and compounds selected from the group consisting of at least one compound of the general formula (I) and a compound of the formula (II), to give a reaction mixture, introduced into a mold and allowed to react to give a polyurethane molding. The present invention further relates to polyurethane moldings obtainable by such a process and also the use of these moldings as steering wheels, seats, armrests and in particular as shoe soles.

14 Claims, No Drawings

MOLDED POLYURETHANE BODIES WITH EXCELLENT FLEXIBILITY AT LOW TEMPERATURE

CROSS-REFERENCE TO RELATED APPLICATIONS

This application is a U.S. National Phase Application of PCT/EP2016/054271, filed Mar. 1, 2016, which claims the benefit of priority to EP Application No. 15158194.9, filed Mar. 9, 2015, the contents of which are hereby expressly incorporated by reference in their entirety.

The present invention relates to a process for producing polyurethane moldings, wherein (a) organic polyisocyanates are mixed with (b) compounds having at least two hydrogen atoms which are reactive toward isocyanate, comprising polyester polyol, (c) blowing agent, (d) catalyst, (e) propylene carbonate and at least one compound selected from the group consisting of compounds of the general formula (I) and a compound of the formula (II), and optionally (f) other auxiliaries and/or additives to give a reaction mixture, introduced into a mold and allowed to react to give a polyurethane molding. The present invention further relates to polyurethane moldings obtainable by such a process and also the use of these moldings as steering wheel, seat, armrest and in particular a shoe sole.

Moldings composed of foamed polyurethanes are known and can be used for a variety of applications, for example as shoe soles. In most applications, these are produced on the basis of polyethers or polyesters as polyols. Here, however, the polyester polyurethanes have better mechanical properties than the polyether polyurethanes. Furthermore, the PESOL polyurethanes (polyester polyol-based polyurethanes) have improved swelling resistance in respect of organic substances such as isooctane. This swelling resistance is an important requirement for use as safety shoe and cannot be satisfied by polyether polyurethane. However, known polyester polyurethanes have a limited low-temperature flexibility, especially at temperatures below −30° C. Thus, the PESOL polyurethanes (polyester polyol-based polyurethanes) have elastic properties at room temperature down to temperatures below 0° C., but they are usually hard and rigid at temperatures below −30° C. For this reason, shoe soles based on thermoplastic rubber are used in countries having extremely low temperatures in winter, e.g. Russia, Scandinavia and Canada. A disadvantage of rubber soles is their high specific gravity of greater than 1 g/cm³ and also a relatively high thermal conductivity and thus a poor insulating action.

The use of plasticizers in polyurethanes is known. Thus, for example, WO 2009/065826 describes the use of dialkyl cyclohexanedicarboxylates in the production of polyester-based polyurethane shoe soles. Here, dialkyl cyclohexanedicarboxylate is used as internal mold release agent. Low-temperature flexibility of the sole is not mentioned in WO 2009/065826.

WO2010125009 describes the addition of tributyl 2-acetoxy-1,2,3-propanetricarboxylate to thermoplastic polyurethane, which can also be foamed. Use as shoe sole is also mentioned as possible field of use. The use of propylene carbonate and use at low temperatures is not subject matter of WO2010125009.

It was an object of the present invention to provide a polyester-based polyurethane molding having excellent elastic properties and excellent flexibility at low temperatures, preferably at temperatures of less than −40° C., particularly preferably at temperatures of less than −45° C.

This object was achieved by a polyurethane molding which is obtained by a process in which (a) organic polyisocyanates are mixed with (b) compounds having at least two hydrogen atoms which are reactive toward isocyanate, comprising polyester polyol, (c) blowing agent, (d) catalyst, (e) propylene carbonate and at least one compound selected from the group consisting of compounds of the general formula (I)

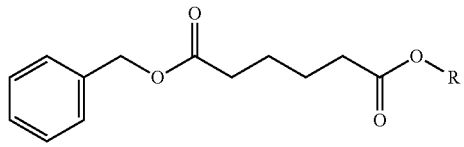

Formula (I)

and a compound of the formula (II),

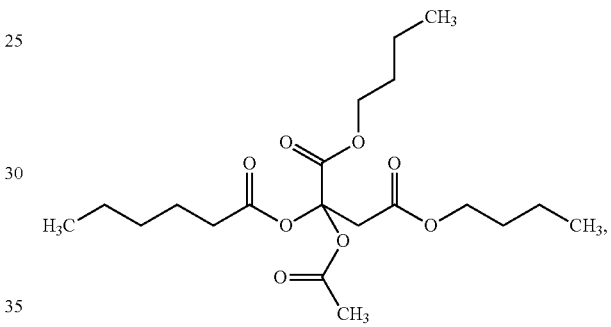

Formula (II)

where R is a hydrocarbon radical which has from 3 to 9 carbon atoms and is bound to the oxygen via a secondary or tertiary carbon atom, and optionally (f) other auxiliaries and/or additives to give a reaction mixture, introduced into a mold and allowed to react to give a polyurethane molding.

The polyurethane moldings of the invention are elastomeric polyurethane foams, preferably polyurethane integral foams. For the purposes of the present invention, an elastomeric polyurethane foam is a polyurethane foam in accordance with DIN 7726 which after brief deformation by 50% of the thickness in accordance with DIN 53 577 displays no remaining deformation of more than 5% of its initial thickness after 10 minutes. For the purposes of the invention, polyurethane integral foams are polyurethane foams in accordance with DIN 7726 having an outer zone which, due to the shaping process, has a higher density than the core. The overall foam density averaged over the core and the outer zone is preferably in the range from 150 g/l to 950 g/l, preferably from 180 g/l to 750 g/l, particularly preferably from 300 g/l to 650 g/l.

The organic and/or modified polyisocyanates (a) used for producing the polyurethane foam moldings of the invention comprise the aliphatic, cycloaliphatic and aromatic bifunctional or polyfunctional isocyanates known from the prior art (constituent a-1) and also any mixtures thereof. Examples are diphenylmethane diisocyanate (MDI), tetramethylene diisocyanate, hexamethylene diisocyanate (HDI), isophorone diisocyanate (IPDI), tolylene 2,4- or 2,6-diisocyanate (TDI) or mixtures of the isocyanates mentioned. MDI comprises monomeric diphenylmethane diisocyanate (MMDI), e.g. diphenylmethane 4,4'-diisocyanate, diphenylmethane 2,4'-diisocyanate, and the mixtures of monomeric diphenylmethane diisocyanates and homologues of diphenylmethane diisocyanate having more than two rings (polymeric MDI).

Preference is given to using 4,4'-MDI. The 4,4'-MDI which is preferably used can comprise from 0 to 20% by weight of 2,4'-MDI and small amounts, up to about 10% by weight, of allophanate-, carbodiimide- or uretonimine-modified 4,4' MDIs. Apart from 4,4'-MDI, it is also possible to use small amounts of 2,4'-MDI and/or polyphenylenepolymethylene polyisocyanate (polymeric MDI). The total amount of these high-functionality polyisocyanates should not exceed 5% by weight of the isocyanate used.

The isocyanates a1) can be used directly or in the form of prepolymers thereof. These polyisocyanate prepolymers are obtainable by reacting polyisocyanates (a-1), as described above, at, for example, temperatures of from 30 to 100° C., preferably at about 80° C., with compounds (a-2) having at least two hydrogen atoms which are reactive toward isocyanate to give the prepolymer.

Such compounds (a-2) having at least two hydrogen atoms which are reactive toward isocyanate are known to those skilled in the art and are described, for example, in "Kunststoffhandbuch, volume 7, Polyurethane", Carl Hanser Verlag, $3^{rd}$ edition 1993, chapter 3.1. Preference is given here to using the polyester polyols described under b). The MDI or the prepolymers of MDI preferably comprise(s), based on the total weight of the MDI including the MDI used for preparing the prepolymers, more than 80% by weight of 4,4'-MDI. The MDI preferably comprises from 0.5 to 10% by weight of carbodiimide-modified MDI, in particular carbodiimide-modified 4,4'-MDI.

The polyols (b) comprise polyester polyols (b1). Polyester polyols having at least two hydrogen atoms which are reactive toward isocyanate groups are used as polyester polyols. Polyester polyols preferably have a number average molecular weight of greater than 450 g/mol, particularly preferably from >500 to <8000 g/mol and in particular from 600 to 3500 g/mol and a functionality of from 2 to 4, in particular from 2 to 3.

Polyester polyols (b1) can, for example, be prepared from organic dicarboxylic acids having from 2 to 12 carbon atoms, preferably aliphatic dicarboxylic acids having from 4 to 10 and in particular from 4 to 6 carbon atoms, and polyhydric alcohols, preferably diols, having from 2 to 12 carbon atoms, preferably from 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in a mixture with one another. Instead of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20-35:35-50:20-32, and in particular adipic acid. Examples of dihydric and polyhydric alcohols, in particular diols, are: ethane diol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol.

It is also possible to use polyester polyols derived from lactones, e.g. ε-caprolactone, or hydroxycarboxylic acids, e.g. ω-hydroxycaproic acid.

To prepare the polyester polyols (b1), the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, e.g. nitrogen, carbon monoxide, helium, argon, inter alia, in the melt at temperatures of from 150 to 250° C., preferably from 180 to 220° C., optionally under reduced pressure, to the desired acid number which is preferably less than 10, particularly preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene to azeotropically distill off the water of condensation. To prepare the polyester polyols, the organic polycarboxylic acids and/or derivatives and polyhydric alcohols are advantageously polycondensed in a molar ratio of 1:1-1.8, preferably 1:1.05-1.2.

Further suitable polyester polyols (b1) are polymer-modified polyester polyols, preferably graft polyester polyols. These are polymer polyester polyols which usually have a content of preferably thermoplastic polymers of from 5 to 60% by weight, preferably from 10 to 55% by weight, particularly preferably from 15 to 50% by weight and in particular from 20 to 40% by weight. These polymer polyester polyols are described, for example, in WO 05/098763 and EP-A-250 351 and are usually prepared by free-radical polymerization of suitable olefinic monomers, for example styrene, acrylonitrile, (meth)acrylates, (meth)acrylic acid and/or acrylamide, in a polyester polyol serving as graft base. In addition to the graft copolymers, the polymer polyester polyol comprises predominantly the homopolymers of the olefins dispersed in unchanged polyester polyol.

In a preferred embodiment, acrylonitrile, styrene, preferably acrylonitrile and styrene, are used as monomers. The monomers are polymerized, optionally in the presence of further monomers, a macromer, i.e. an unsaturated, free-radically polymerizable polyol, a moderator and using a free-radical initiator, usually azo or peroxide compounds, in a polyester polyol as continuous phase. This process is described, for example, in DE 111 394, U.S. Pat. Nos. 3,304,273, 3,383,351, 3,523,093, DE 1 152 536 and DE 1 152 537.

During the free-radical polymerization, the macromers are incorporated into the copolymer chain. This results in formation of block copolymers having a polyester block and a poly-acrylonitrile-styrene block which act as phase compatibilizers in the interface between continuous phase and dispersed phase and suppress agglomeration of the polymer polyester polyol particles. The proportion of the macromers is usually from 1 to 20% by weight, based on the total weight of the monomers used for preparing the polymer polyol.

If polymer polyester polyol is comprised, this is preferably present together with further polyester polyols. The proportion of polymer polyol is particularly preferably greater than 5% by weight, based on the total weight of the component (b). The polymer polyester polyols can, for example, be comprised in an amount of from 7 to 90% by weight, or from 11 to 80% by weight, based on the total weight of the component (b).

Apart from polyester polyols (b1), further polyols customary in polyurethane chemistry and having a number average molecular weight of greater than 500 g/mol, for example polyetherols, can also be used. Here, the proportion of the further polyols is preferably less than 40% by weight, particularly preferably less than 20% by weight, very particularly preferably less than 10% by weight, more preferably less than 5% by weight and in particular 0% by weight, based on the total weight of polyester polyols (b) and the further polyols.

Furthermore, the compounds (b) having at least two hydrogen atoms which are reactive toward isocyanate can comprise chain extenders and/or crosslinkers. For the purposes of the present invention, chain extenders and/or crosslinkers are substances having a molecular weight of preferably less than 450 g/mol, particularly preferably from 60 to 400 g/mol, with chain extenders having two hydrogen atoms which are reactive toward isocyanate and crosslinkers having three hydrogen atoms which are reactive toward isocyanate. These can preferably be used individually or in the form of mixtures. Preference is given to using diols and/or triols having molecular weights of less than 400, particularly preferably from 60 to 300 and in particular from 60 to 150. Possibilities are, for example, aliphatic, cycloaliphatic and/or araliphatic diols having from 2 to 14, preferably from 2 to 10, carbon atoms, e.g. ethylene glycol, 1,3-propanediol, 1,10-decanediol, 1,2-, 1,3-, 1,4-dihydroxycyclohexane, diethylene glycol, dipropylene glycol and 1,4-butanediol, 1,6-hexanediol and bis-(2-hydroxyethyl)hydroquinone, triols such as 1,2,4-, 1,3,5-trihydroxycyclohexane, glycerol and trimethylolpropane, and low molecular weight hydroxyl-containing polyalkylene oxides based on ethylene oxide and/or 1,2-propylene oxide and the abovementioned diols and/or triols as starter molecules. Particular preference is given to using monoethylene glycol, 1,4-butanediol, diethylene glycol, glycerol or mixtures thereof as chain extenders (f).

If chain extenders, crosslinkers or mixtures thereof are employed, these are advantageously used in amounts of from 1 to 60% by weight, preferably from 1.5 to 40% by weight and in particular from 2 to 20% by weight, based on the total weight of the component b).

Furthermore, blowing agents c) are present in the production of polyurethane foam moldings. These blowing agents c) can comprise water. Apart from water, generally known chemically and/or physically acting compounds can be used as blowing agents c). For the purposes of the present invention, chemical blowing agents are compounds which react with isocyanate to form gaseous products, for example water or formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons and ethers, esters, ketones, acetals or mixtures thereof, for example (cyclo) aliphatic hydrocarbons having from 4 to 8 carbon atoms, or fluorinated hydrocarbons such as Solkane® 365 mfc from Solvay Fluorides LLC. In a preferred embodiment, a mixture comprising at least one of these blowing agents and water is used as blowing agent, in particular water as sole blowing agent. If no water is used as blowing agent, preference is given to using exclusively physical blowing agents.

The content of water is, in a preferred embodiment, from 0.1 to 2% by weight, preferably from 0.2 to 1.5% by weight, particularly preferably from 0.3 to 1.2% by weight, based on the total weight of the components (a) to (f).

In a further preferred embodiment, hollow microspheres comprising physical blowing agent are added as additional blowing agent in the reaction of the components (a) to (f). The hollow microspheres can also be used in a mixture with the abovementioned blowing agents.

The hollow microspheres usually consist of a shell composed of thermoplastic polymer and are filled in the core with a liquid, low-boiling substance based on alkanes. The production of such hollow microspheres is described, for example, in U.S. Pat. No. 3,615,972. The hollow microspheres generally have a diameter of from 5 to 50 µm. Examples of suitable hollow microspheres are obtainable under the tradename Expancell® from Akzo Nobel.

The hollow microspheres are generally added in an amount of from 0.5 to 5% by weight, based on the total weight of the components b) and c).

As catalysts (d) for producing the polyurethane foams, preference is given to using compounds which strongly accelerate the reaction of the compounds (b) having at least two hydrogen atoms which are reactive toward isocyanates with the organic, optionally modified polyisocyanates (a). Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Further possibilities are organic metal compounds, preferably organic tin compounds such as tin (II) salts of organic carboxylic acids, e.g. tin (II) acetate, tin (II) octoate, tin (II) ethylhexanoate and tin (II) laurate, and the dialkyl tin (IV) salts of organic carboxylic acids, e.g. dibutyl tin diacetate, dibutyl tin dilaurate, dibutyl tin maleate and dioctyl tin diacetate, and also bismuth carboxylates such as bismuth (III) neodecanoate, bismuth 2-ethylhexanoate and bismuth octanoate, or mixtures thereof. The organic metal compounds can be used either alone or preferably in combination with strongly basic amines. Preference is given to using exclusively amine catalysts as catalysts (d).

Preference is given to using from 0.001 to 5% by weight, in particular from 0.05 to 2% by weight, of catalyst or catalyst combination, based on the weight of the components (b) and (d).

As a compound (e), use is made of propylene carbonate and at least one compound selected from the group consisting of compounds of the general formula (I), Formula (I)

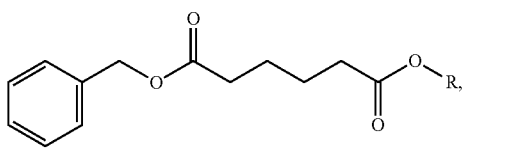

where R is a hydrocarbon radical which has from 3 to 9 carbon atoms and is bound to the oxygen via a secondary or tertiary carbon atom, with R preferably being a hydrocarbon radical having 8 carbon atoms and in particular R being a linear hydrocarbon radical having 8 carbon atoms which is bound to the oxygen via the C-3 carbon atom, and a compound of the formula (II)

Formula (II)

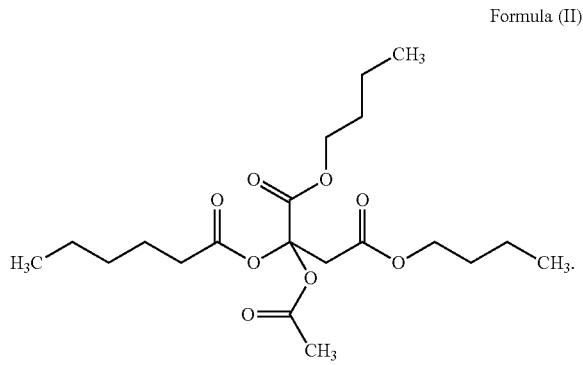 [SMILES: CCCCCC(=O)OC(CC(=O)OCCCC)(OC(C)=O)C(=O)OCCCC]

The compound of the general formula (I) is particularly preferably benzyl isooctyl adipate:

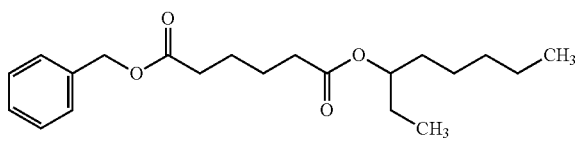

These compounds are commercially available. Propylene carbonate is formed as by-product in the synthesis of polycarbonate from propylene oxide and carbon dioxide. It can also be prepared from propylene glycol and urea using a zinc-iron mixed oxide catalyst. Benzyl isooctyl adipate can, for example, be procured under the tradename Adimoll® BO from Lanxess. The compound of the formula (II) is also referred to as acetyl tri-n-butyl citrate and can, for example, be procured under the tradename Citrofol® BII from Jungbunzlauer.

The compound (e) is preferably used in an amount of from 1 to 30% by weight, preferably from 2 to 25% by weight and in particular from 5 to 20% by weight, in each case based on the total weight of the components b) and e). Here, propylene carbonate is preferably used in an amount of from 0.5 to 15% by weight, particularly preferably from 2 to 8% by weight, based on the total weight of the components (b) and (e). The at least one compound selected from the group consisting of a compound of the formula (I) and a compound of the formula (II) is preferably used in an amount of from 0.5 to 29% by weight, particularly preferably from 4 to 25% by weight and in particular from 8 to 20% by weight, based on the total weight of the components (b) and (e). Preference is given here to using either the compound of the formula (I) or the compound of the formula (II). The weight ratio of propylene carbonate to the total weight of the compound of the formula (I) and the compound of the formula (II) is preferably from 1:0.5 to 1:5, particularly preferably from 1:1 to 1:4 and in particular from 1:1.5 to 1:3.

Auxiliaries and/or additives (f) can optionally also be added to the reaction mixture for producing the polyurethane foams. Mention may be made by way of example of mold release agents, fillers, dyes, pigments, hydrolysis inhibitors, antistatics, odor-absorbing substances and fungistatic and/or bacteriostatic substances.

As suitable mold release agents, mention may be made by way of example of: reaction products of fatty acid esters with polyisocyanates, salts of fatty acids and polysiloxanes comprising amino groups, salts of saturated or unsaturated (cyclo)aliphatic carboxylic acids having at least 8 carbon atoms and tertiary amines and also, in particular, internal mold release agents such as carboxylic esters and/or carboxamides prepared by esterification or amidation of a mixture of montanic acid and at least one aliphatic carboxylic acid having at least 10 carbon atoms by means of at least bifunctional alkanolamines, polyols and/or polyamines having molecular weights of from 60 to 400 g/mol, as disclosed, for example, in EP 153 639, mixtures of organic amines, metal salts of stearic acid and organic monocarboxylic and/or dicarboxylic acids or anhydrides thereof, as disclosed, for example, in DE-A-3 607 447, or mixtures of an imino compound, the metal salt of a carboxylic acid and optionally a carboxylic acid, as disclosed, for example, in U.S. Pat. No. 4,764,537. Reaction mixtures according to the invention preferably do not comprise any further mold release agents.

For the purposes of the present invention, fillers, in particular reinforcing fillers, are the customary organic and inorganic fillers, reinforcing materials, weighting agents, coating compositions, etc., known per se. Specific examples are: inorganic fillers such as siliceous minerals, for example sheet silicates such as antigorite, bentonite, serpentine, hornblendes, amphibols, chrysotile and talc, metal oxides such as kaolin, aluminum oxides, titanium oxides, zinc oxide and iron oxides, metal salts such as chalk and barite and inorganic pigments such as cadmium sulfide, zinc sulfide and also glass, inter alia. Preference is given to using kaolin (China clay), aluminum silicate and coprecipitates of barium sulfate and aluminum silicate. Examples of possible organic fillers are: carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and in particular carbon fibers. The inorganic and organic fillers can be used individually or as mixtures and are advantageously added in amounts of from 0.5 to 50% by weight, preferably from 1 to 40% by weight, based on the weight of the components (a) to (f), to the reaction mixture.

The hydrolysis stability of polyester polyurethanes can be significantly improved by the addition of additives such as carbodiimides. Such materials are commercially available under trade names such as Elastostab™ or Stabaxol™.

As antistatic additives, it is possible to use conventional antistatic additives known for polyurethanes. These comprise quaternary ammonium salts and ionic liquids.

In the process of the invention, the starting components (a) to (f) are mixed with one another in such amounts that the theoretical equivalence ratio of NCO groups of the polyisocyanates (a) to the sum of the reactive hydrogen atoms of the components (b) to (f) is from 1:0.8 to 1:1.25, preferably from 1:0.9 to 1:1.15. Here, a ratio of 1:1 corresponds to an isocyanate index of 100. For the purposes of the present invention, the isocyanate index is the stoichiometric ratio of isocyanate groups to groups which are reactive toward isocyanate, multiplied by 100.

The present invention further provides a polyurethane molding obtainable by the process of the invention.

The polyurethane foam moldings of the invention are preferably produced by the one-shot process with the aid of the low-pressure or high-pressure technique in closed, advantageously heated molds. The molds usually consist of metal, e.g. aluminum or steel. These modes of operation are described, for example, by Piechota and Röhr in "Integralschaumstoff", Carl-Hanser-Verlag, Munich, Vienna, 1975, or in "Kunststoffhandbuch", volume 7, Polyurethane, 3rd edition, 1993, chapter 7.

The starting components (a) to (e) are for this purpose preferably mixed at a temperature of from 15 to 90° C., particularly preferably from 25 to 55° C., and the reaction mixture is introduced into the mold, optionally under superatmospheric pressure. Mixing can be carried out mechanically by means of a stirrer or a stirring screw or under high pressure in the countercurrent injection process. The mold temperature is advantageously from 20 to 160° C., preferably from 30 to 120° C., particularly preferably from 30 to 60° C. For the purposes of the invention, the mixture of the components (a) to (e) at reaction conversions of less than 90%, based on the isocyanate groups, is referred to as reaction mixture. The amount of the reaction mixture introduced into the mold is such that the moldings obtained, in particular integral foam, have a density of preferably from 150 g/l to 950 g/l, more preferably from 180 g/l to 600 g/l, particularly preferably from 300 g/l to 650 g/l. The degrees of compaction for producing the polyurethane integral foams of the invention are in the range from 1.1 to 4, preferably from 1.6 to 3.

The two-component process is preferably employed. For this purpose, an isocyanate component is mixed with a polyol component. Here, the isocyanate component comprises the isocyanates (a) and the polyol component comprises the compounds (b) having at least two hydrogen atoms which are reactive toward isocyanate and, if chemical blowing agents are used, blowing agents (c). The polyol component preferably further comprises the catalysts (d). The auxiliaries and additives are also preferably added to the polyol component. The component (e) can be added either to the isocyanate component or the polyol component. Preference is given to adding propylene carbonate to the isocyanate component and adding the compounds of the formula (I) and of the formula (II) to the polyol component. Here, the polyol component is storage-stable and does not demix. To produce the polyurethane moldings of the invention, the isocyanate component and the polyol component are then mixed and processed as described above.

The polyurethane moldings of the invention are preferably used as shoe sole and particularly preferably as (through) sole, for example for street shoes, sports shoes, safety shoes and boots. In particular, the polyurethane integral foams of the invention are used as (through)sole for safety shoes or as sole material for boots. Furthermore, polyurethane foams according to the invention can be used in the interior of vehicles, for example in motor cars as steering wheels, headrests or gear knobs or as chair armrests. Further possible uses are as armrests for chairs or as motorcycle seats. Further possible applications are applications, sealants, damping mats, footfall damping, ski boot construction elements or in applications which are used in relatively cold environments. Polyurethane moldings according to the invention display excellent mechanical properties, in particular excellent low-temperature flexibility, excellent mechanical properties after hot-humid storage and only low abrasion.

The invention is illustrated below with the aid of examples.

EXAMPLES

The following compounds were used:

Iso1: isocyanate prepolymer which has an NCO content of 16% and can be prepared by reacting 4,4'-MDI and about 4% by weight, based on the total weight of the isocyanates used for prepolymer production, of carbodiimide-modified MDI and a mixture of polyester polyols having an average functionality of 2.16 and an OHN of 56 mg KOH/g on the basis of adipic acid, monoethylene glycol, diethylene glycol, 1,4-butanediol and glycerol.

Polyol 1: polyester polyol based on adipic acid, monoethylene glycol and diethylene glycol and having an OH number of 38 mg KOH/g Polyol 2: polyester polyol based on adipic acid, 1,4-butanediol and 1,6-hexanediol and having an OH number of 56 mg KOH/g KV 1: monoethylene glycol Kat1: triethylenediamine in monoethylene glycol (33% by weight)

Z1: polysiloxane

Z2: internal mold release agent

W1: tris(2-chloroisopropyl) phosphate

W2: Freeflex DPG-A (dipropylene glycol dibenzoate)

W3: Citroflex® A2 (acetyl triethyl citrate)

W4: Citroflex® 2 (triethyl citrate)

W5: Uniplex 83 (tri-n-butyl citrate)

W6: Hexamoll® Dinch from BASF

W7: propylene carbonate

W8: benzyl isooctyl adipate

W9: compound of the formula (II)

93 parts by weight of isocyanate 1 and 6 parts by weight of W7 were mixed to form an isocyanate component B. This B component has an NCO content of 16%. The remaining components were combined as per table 1 to form a polyol component A. Polyol component and isocyanate component were mixed by means of a low-pressure PU casting machine and the resulting reaction mixture was introduced as per table 1 into a closed mold having the dimensions 20 cm×20 cm×1 cm. All amounts indicated in table 1 for the starting substances are parts by weight. The isocyanate index is likewise reported in table 1. Here, work was carried out at the optimal isocyanate index. This was determined by means of a penetrometer. The test plates obtained were conditioned under a standard atmosphere for two days before mechanical characterization was carried out. Here, the hardness, the rebound resilience in accordance with DIN 53512, the tear propagation resistance in accordance with DIN ISO 34-1,A, the tensile strength in accordance with DIN 53504 and the elongation at break in accordance with DIN 53543 were determined. To determine the hydrolysis properties, the test specimens were stored in accordance with DIN 53543 at 70° C. and 95% relative atmospheric humidity and the tensile strength and the elongation at break of the specimen were measured after 14 days and 21 days of hydrolysis aging. The results of these measurements are likewise reported in table 1.

TABLE 1

|  | Comp. 1 | Comp. 2 | Comp. 3 | Comp. 4 | Comp. 5 | Comp. 6 | Comp. 7 | Ex. 2 | Ex. 1 |
|---|---|---|---|---|---|---|---|---|---|
| Polyol 1 | 43.97 | 36.47 | 36.47 | 36.47 | 36.47 | 36.47 | 36.47 | 36.47 | 36.47 |
| Polyol 2 | 43.97 | 36.47 | 36.47 | 36.47 | 36.47 | 36.47 | 36.47 | 36.47 | 36.47 |
| KV 1 | 6.83 | 6.83 | 6.83 | 6.83 | 6.83 | 6.83 | 6.83 | 6.83 | 6.83 |
| Z2 | 2.72 | 2.72 | 2.72 | 2.72 | 2.72 | 2.72 | 2.72 | 2.72 | 2.72 |
| Water | 0.40 | 0.40 | 0.40 | 0.40 | 0.40 | 0.40 | 0.40 | 0.40 | 0.40 |
| Z1 | 0.16 | 0.16 | 0.16 | 0.16 | 0.16 | 0.16 | 0.16 | 0.16 | 0.16 |
| Cat 1 | 1.95 | 1.95 | 1.95 | 1.95 | 1.95 | 1.95 | 1.95 | 1.95 | 1.95 |
| W1 |  | 15.00 |  |  |  |  |  |  |  |
| W2 |  |  | 15.00 |  |  |  |  |  |  |
| W3 |  |  |  | 15.00 |  |  |  |  |  |
| W4 |  |  |  |  | 15.00 |  |  |  |  |
| W5 |  |  |  |  |  | 15.00 |  |  |  |
| W6 |  |  |  |  |  |  | 15.00 |  |  |
| W8 |  |  |  |  |  |  |  | 15.00 |  |
| W9 |  |  |  |  |  |  |  |  | 15.00 |
| Mixing ratio (optimum) A:B = 100:X | 96.4 | 93.4 | 92.4 | 93.5 | 95.5 | 93.1 | — | 92.1 | 93.5 |
| Isocyanate index | 95 | 95 | 94 | 95 | 97 | 91 | — | 94 | 95 |
| Rise time [sec] | 78 | 80 | 67 | 75 | 74 | 79 | — | 70 | 70 |
| Hardness (Shore A) | 44 | 41 | 43 | 44 | 41 | 44 | — | 44 | 45 |
| Free-foamed density | 317 | 314 | 322 | 321 | 295 | 327 | — | 321 | 323 |
| Density of molding | 511 | 514 | 515 | 515 | 519 | 526 | — | 532 | 522 |
| Tensile strength [N/mm$^2$] | 6.9 | 5.6 | 5.4 | 5.6 | 5.2 | 5.9 | — | 4.3 | 5.9 |
| Elongation at break [%] | 457 | 500 | 490 | 465 | 504 | 495 | — | 457 | 466 |
| Tear propagation resistance [N/mm] | 7.5 | 7.3 | 7.8 | 8.7 | 8.0 | 7.9 | — | 7.3 | 8.9 |
| Rebound [%] | 55 | 55 | 55 | 55 | 54 | 54 | — | 56 | 55 |
| Tensile strength after hydrolysis (21 days) [N/mm$^2$] | 4.3 | 2.1 | 3.4 | 1.7 | 0.5 | 2.0 | — | 3.2 | 3.6 |
| Elongation at break after hydrolysis (21 days) [%] | 509 | 327 | 475 | 245 | 43 | 329 | — | 452 | 479 |

When W6 was used, no stable polyol component was obtained. Thus, no foam could be produced.

To determine the low-temperature flexibility, test plates were obtained by an analogous process using the starting materials specified in table 2. This was carried out at an isocyanate index which was 1.5 points below the optimum.

TABLE 2

|  | Ex. 3 | Ex. 4 | Comp. 8 | Comp. 9 | Ex. 5 | Ex. 6 |
|---|---|---|---|---|---|---|
| Polyol 1 | 37.17 | 37.17 | 37.17 | 37.17 | 37.17 | 37.17 |
| Polyol 2 | 37.17 | 37.17 | 37.17 | 37.17 | 37.17 | 37.17 |
| KV 1 | 6.83 | 6.83 | 6.83 | 6.83 | 6.83 | 6.83 |
| Z2 | 2.72 | 2.72 | 2.72 | 2.72 | 2.72 | 2.72 |
| Water | 0.4 | 0.4 | 0.4 | 0.4 | 0.4 | 0.4 |
| Z1 | 0.16 | 0.16 | 0.16 | 0.16 | 0.16 | 0.16 |
| Cat 1 | 1.95 | 1.95 | 1.95 | 1.95 | 1.95 | 1.95 |
| W1 | 3.63 | — | 3.63 | — | 3.63 | — |
| W2 | — | — | 9.97 | 13.6 | — | — |
| W8 | — | — | — | — | 9.97 | 13.6 |
| W9 | 9.97 | 13.6 | — | — | — | — |
| Mixing ratio A:B = 100:X | 93 | 94 | 94 | 94 | 94 | 94 |
| Optimal mixing ratio A:B = 100:X | 96 | 97 | 97 | 97 | 97 | 96 |
| Free-foamed density [g/l] | 271 | 269 | 265 | 266 | 267 | 269 |
| Density of molding [g/l] | 500 | 500 | 500 | 500 | 500 | 500 |
| Demolding time [mm:sec] | 04:00 | 04:00 | 04:00 | 04:00 | 04:00 | 04:00 |
| Hardness [Shore A] | 39 | 40 | 40 | 39 | 40 | 39 |
| Abrasion (mg) | 202 | 139 | 234 | 265 | 73 | 49 |
| Tensile strength [N/mm$^2$] | 5.8 | 6.0 | 5.8 | 5.6 | 5.5 | 5.5 |
| Elongation at break [%] | 551 | 532 | 540 | 538 | 541 | 552 |
| Tear propagation resistance [N/mm] | 6.3 | 6.4 | 6.3 | 6.6 | 6.8 | 6.4 |
| Tensile strength after hydrolysis (14 days) [N/mm$^2$] | 3.3 | 5.1 | 4.1 | 4.5 | 3.9 | 3.4 |

TABLE 2-continued

| | Ex. 3 | Ex. 4 | Comp. 8 | Comp. 9 | Ex. 5 | Ex. 6 |
|---|---|---|---|---|---|---|
| Elongation at break after hydrolysis (14 days) [%] | 509 | 565 | 542 | 551 | 526 | 496 |
| Low-temperature flexibility in accordance with GOST 27420-87, 8000 cycles at −45° C. | Passed | Passed | Not passed | Not passed | Passed | Passed |

These experiments show that the GOST test at −45° C. can be passed only when using the compounds according to the invention. Furthermore, the specimens comprising benzyl isooctyl adipate surprisingly display excellent abrasion properties. Here, the abrasion was determined in accordance with DIN 53516 using a contact pressure of 10 N.

The invention claimed is:

1. A process for producing polyurethane moldings, wherein
   a) organic polyisocyanates are mixed with
   b) one or more compounds having at least two hydrogen atoms which are reactive toward isocyanate, comprising polyester polyol,
   c) blowing agent,
   d) catalyst, and
   e) propylene carbonate and at least one compound selected from the group consisting of compounds of the general formula (I), Formula (I)

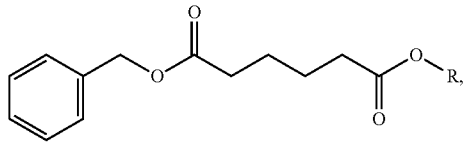

where R is a hydrocarbon radical which has from 3 to 9 carbon atoms and is bound to the oxygen via a secondary or tertiary carbon atom,
and a compound of the formula (II), Formula (II)

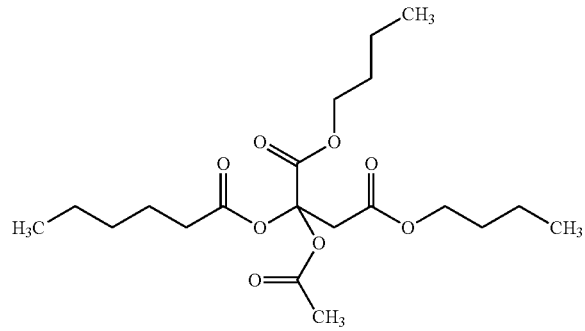

to give a reaction mixture, introduced into a mold and allowed to react to give a polyurethane molding.

2. The process according to claim 1, wherein R is a linear hydrocarbon radical which has 8 carbon atoms and is bound to the oxygen via the C-3 carbon atom.

3. The process according to claim 1, wherein the compound e) is used in an amount of from 1 to 30% by weight, based on the total weight of the components b) and e).

4. The process according to claim 1, wherein the weight ratio of propylene carbonate to the total weight of the compound of the formula (I) and the compound of the formula (II) is from 1:0.5 to 1:5.

5. The process according to claim 1, wherein MDI or prepolymers of MDI is/are used as isocyanate a).

6. The process according to claim 5, wherein the MDI or the prepolymers of MDI comprise(s), based on the total weight of the MDI including the MDI used for preparing the prepolymers, more than 80% by weight of 4,4'-MDI.

7. The process according to claim 1, wherein the MDI or the prepolymers of MDI comprise(s), based on the total weight of the MDI including the MDI used for preparing the prepolymers, from 0.5 to 10% by weight of carbodiimide-modified MDI.

8. The process according to claim 5, wherein the prepolymer of MDI is obtainable by reaction of MDI with polyester polyol.

9. The process according to claim 1, wherein the polyester polyol comprises a polyester polyol (b1) which is obtainable by condensation of dicarboxylic acids having from 4 to 10 carbon atoms with a bifunctional and/or trifunctional, aliphatic alcohol.

10. The process according to claim 9, wherein the component (b) comprises less than 10% by weight of further polyols in addition to the components (b1).

11. A polyurethane molding obtainable by a process according to claim 1.

12. The polyurethane molding according to claim 11, wherein the polyurethane molding is a polyurethane integral foam having a density of from 150 to 950 g/l.

13. The polyurethane molding according to claim 11, wherein the polyurethane molding is a shoe sole.

14. The process according to claim 1, wherein a), b), c), d), and e) are further mixed with f) other auxiliaries and/or additives to give a reaction mixture, introduced into a mold and allowed to react to give a polyurethane molding.

* * * * *